Patented June 26, 1945

2,378,969

UNITED STATES PATENT OFFICE 2,378,969

PURIFICATION PROCESS

Grant C. Bailey and James A. Reid, Bartlesville, Okla., assignors to Phillips Petroleum Company, a corporation of Delaware No Drawing. Application February 13, 1942, Serial No. 430,834

9 Claims. (Cl. 260—677)

This invention relates to the purification of hydrocarbons, and more particularly to the removal of small proportions of impurities from olefin-containing mixtures which are to be used in catalytic reactions.

In the conduct of a wide variety of chemical reactions, the use of catalytic materials has been found to permit the use of temperatures and pressures far lower than those necessary in the corresponding thermal reactions, to increase the rate of the reaction, and to greatly increase the yield of particular desired products of the reaction. Many processes which were not otherwise operative have been developed and commercialized as a result of the availability of satisfactory catalysts.

Since in many processes a catalyst may function for the conversion of many volumes or units of reactants without appreciable effect on the catalytic material, the initial cost of the catalyst is relatively unimportant if the useful operating life of the catalytic material is sufficiently long. For example, metallic platinum has found application in some catalytic processes, particularly hydrogenation. The ease of reactivation of the catalyst is also of importance in some cases.

A particular group of catalytic materials is known as contact catalysts. These catalysts are distinguished from other types by the fact that they are solid materials which influence chemical reactions by nature of their surface characteristics. The activity of these catalysts is not only a function of their chemical composition, but is dependent upon the total extent of surface and upon the specific orientations of the surface materials. In order to secure the desired catalytic activity in a contact catalyst, it is frequently necessary to follow an intricate ritual and to observe a multitude of precautions in order to obtain a satisfactory preparation. In spite of these limitations, such catalysts have found extensive application in sulfuric acid manufacture, ammonia synthesis, hydrogenation of a wide variety of materials including fats and oils, carbon monoxide, and olefins, dehydrogenation of hydrocarbons, hydration and dehydration reactions, and a variety of oxidation reactions.

Many of the contact catalyst mixtures contain metals and metal oxides as the active catalytic material, frequently in combination or in conjunction with other metals, metal oxides, or other solids which may aid in the activation of the catalytically active metal, may act as a promoter in the reaction, or may act as a supporting material to increase the extent of the surface, to increase the effective contact of the surface with reactive charge material, to aid in heat dissipation, and the like. Among the metals and/or metal oxides which are frequently used in these systems in association with oxides or other salts of the metal, solid supporting materials, etc. are nickel, cobalt, iron, platinum, copper, and silver. Other metals or combinations of these are frequently used in particular catalysts.

One of the factors which limits the application and utility of such types of contact catalysts is their extreme susceptibility to poisoning or deactivation through contact with other materials. In the preparation of many of these catalysts, extreme care must be exercised to exclude various specific materials. For example, in the preparation of nickel hydrogenation catalysts care must be exercised to exclude or to remove substantially all the chlorides from the catalyst, since the presence of traces of chlorides in the finished catalyst markedly reduces its activity and useful life.

In the utilization of such contact catalysts, the presence of materials in the reactant charge which reduce the activity of the catalyst is particularly undesirable. Since the initial cost of the catalytic material may be high, and its preparation in an active state is frequently costly, operation for a prolonged period, or the conversion of many units of reactant by a single unit of catalyst is often a requisite for satisfactory operation of a process. In many processes using these contact catalysts, it is found that the reduction in activity of the catalyst is not proportional to the amount of metal combined with the impurities. It is frequently observed that an amount of catalyst-deactivating material adequate to react with one per cent or less of the total catalytic metal or metal compound present may be sufficient to reduce the activity of the catalyst by more than 50 per cent, or in some cases to completely destroy its catalytic activity. For example, in the hydrogenation of ethylene using an active nickel catalyst less than 0.001 per cent of carbon monoxide reduced the rate of hydrogenation of ethylene to less than 10 per cent of its original value.

Various theories have been advanced to explain the extreme effect of traces of materials on the activity of these contact catalysts. One generally accepted explanation assumes that of the total catalytic material present, only a small proportion is catalytically active under the particular conditions of operation. Thus, deactivation of only that small fraction of the catalyst substantially destroys the usefulness of the catalyst. Another concept which has been advanced assumes that the catalyst-deactivating material rapidly migrates through the active catalyst, converting it to inactive form. Still another concept involves the assumption that the activated state is thermodynamically unstable, and the catalyst-deactivating materials are powerful agents for establishing equilibrium between the species present, thus bringing about catalyst deactivation. The utility of this invention is in no way dependent upon the validity of these or other postulates regarding the mechanism of the catalyst deactivation; the theories are here mentioned to stress the importance of this poisoning effect from theoretical as well as practical viewpoints.

The poisoning of the surface-active catalysts may vary, depending upon the particular catalyst and chemical reactants involved. In some cases, the poison effect may be reduced or eliminated through treatment of the catalyst with a poison-free fluid for an adequate period; in other cases catalyst activity may be restored by special chemical treatment in place; most frequently, it is necessary to follow the procedure used in initially preparing the catalytically active preparation, with suitable treatment for elimination of the contaminants.

In conversion processes using the surface-active catalysts as hereinbefore described, satisfactory operation of the process frequently depends upon the removal of traces of contaminants from the charge stocks. These contaminants which accelerate the deactiviation rate of the catalytic materials vary widely in their chemical nature, and in their effects in different processes. For example, the presence of small amounts of water in one reaction system may be essential, whereas the presence of a similar proportion of water in another system may completely stop the reaction. Among the more common deactivating materials or poisons encountered in these systems are oxygen compounds, such as water, alcohols, ethers, peroxides, etc., sulfur compounds such as hydrogen sulfide, mercaptans, sulfides, sulfur oxides, and even elementary sulfur, carbon monoxide and in some cases carbon dioxide, and occasionally reactive types of hydrocarbons, such as diolefins, acetylene-type compounds, and some aromatics, which may deposit carbonaceous or polymeric residues on the catalysts.

In the conventional preparation of materials to be used as charge in these processes, an attempt is made to remove the known impurities as completely as possible. However, even after such treatment, sufficiently large traces of known contaminants may be present, or some materials may be present in such small proportions as to be unidentified, that the useful activity or the life of the catalyst is serious reduced.

It is an object of this invention to afford a means of removing small amounts of undesirable materials from a fluid mixture.

Another object of this invention is to remove undesirable impurities from a charge stock containing mono-olefins which is to undergo conversion in a contact catalyst system.

Another object of this invention is to secure high activity and long life from a contact catalyst by purifying the material charged to said catalyst.

Another object of this invention is to secure optimum activity and long life from a contact catalyst used for converting olefinic hydrocarbons by the removal of traces of contaminants from the charge to such a catalyst. Other objects and advantages of our invention will become apparent to one skilled in the art from the accompanying disclosure and discussion.

We have found that these objects can be attained by contacting a mixture containing mono-olefins with a metal which forms alkyl derivatives which are highly reactive with water, in combination with a hydrogenation catalyst prepared from an iron group metal. The preferred purification system contains metallic sodium, potassium, or an alloy of the two, or an amalgam of either or both, in conjunction with a reduced nickel hydrogenation catalyst.

This system containing the two types of metals in admixture has been found to be particularly advantageous for the removal of traces of impurities from olefine-containing mixtures which are to be subjected to conversions in contact catalyst systems, such as polymerization, hydrogenation, hydration, and the like. The substantial absence of hydrogen and hydrogen-containing gas from the charge to the purification is necessary for its satisfactory functioning in the presence of olefins. The mixtures to be purified may include gaseous materials, in which case it may be desirable to use a higher-boiling inert diluent, such as a paraffinic hydrocarbon diluent, to facilitate contact of the gaseous charge with the solid reagents. The liquid hydrocarbons and other mixtures, which should preferably contain at least a minor proportion of monoolefins, may very satisfactorily be treated at atmospheric or elevated pressures in this system. It is desirable that the impurities in the charge be relatively low in concentration, so that the effective life of the purification system may be as long as possible. The removal of the major proportion of any impurities may be accomplished by conventional treating means.

The purification system containing a metal, alkyl derivatives of which are reactive with water, together with a metal active for catalytic hydrogenation may be operated in the preferred temperature range of 50 to 150° C., a temperature of about 110° C. having been found generally satisfactory; however, higher or lower temperatures may be useful in particular instances. The lower temperature limit is established by the capacity of the system to remove impurities at a satisfactory rate, since the rate of purification decreases with decrease in temperature. The upper temperature limit is established by the reaction of major components in the mixture with the metals in the system, resulting in deactivation of the purification system. For example, in the purification of an olefin-containing mixture at 190° C. the effective life of the purification system was relatively short, as a result of reaction between the olefin and sodium to form a solid which was not effective in the purification system. At temperatures in the range of 110° C. the purification system has been found to function for long periods of time without appreciable decrease in effectiveness. Conditions of pressure and contact time are not as critical as conditions of temperature. However, when effluent from the purification step is charged to a subsequent step for the conversion of at least a portion of said effluent, we prefer to operate the purification system at substantially the same pressure as said subsequent conversion step is operated. The purification step may be operated at a greater or lower pressure, however, than the preferred pressure as will appear desirable to the operator of our purification step. The actual contact time at any given temperature within the preferred temperature range depends upon the degree of purification desired by the operator of the purification step. Long contact times usually result in a higher degree of purification although when such purification is not necessary shorter contact times may be used.

The iron group metal found most satisfactory in this purification system is nickel which has been deposited on a support such as kieselguhr, and which has been so treated as to make it active for hydrogenation reactions. Cobalt catalysts which are active as hydrogenation catalysts are similarly useful in these purification systems. Iron similarly prepared is less effective in these purification systems, but may be used under some conditions. Some other hydrogenation catalysts, such as copper chromite, have been found to have limited applicability in these purification systems, whereas others, such as chromium oxide and molybdenum sulfide are not satisfactory.

Sodium or potassium, or alloys or amalgams of these metals, are preferred as the metals whose alkyl derivatives react vigorously with water. The other alkali and alkaline earth metals may also be used in these systems, although the alkaline earth metals especially are less active than the preferred alkali metals. It is desirable that these metals be brought into as intimate and prolonged contact as possible with the contaminated material so that the purification can be complete. The alkali or alkaline earth metal should, therefore, be commingled with the active iron group metal in a finely divided state so that a high extent of surface is exposed, or preferably it should be used in the liquid state. The use of appropriate alloys or amalgams of the alkali or alkaline earth metals makes possible the commingling of the liquid metal with the iron group metal and the charge, even at temperatures below the freezing point of the pure metals. In this way, intimate contact of the reactants is secured at any desired operating temperature.

In the application of this procedure for the elimination of contaminants from charge stocks to contact catalysts, the treatment may be conducted in a variety of ways. The purification can be conducted in a batch system, by placing the alkali or alkaline earth metal, preferably in a molten state or as a liquid alloy or amalgam, the active hydrogenation metal, and the charge to be purified in a vessel suitable for retaining the materials, heating to the desired temperature, such as 110° C., and agitating the mixture so that intimate contact is secured.

In a continuous treating system, a tower may be filled with the supported nickel or nickel-type catalyst, and the molten alkali or alkaline earth metal preparation may be so placed that it fills the voids in the lower quarter to lower half of the packed tower. With the active material at the desired temperature, the gas or liquid to be purified is introduced in the bottom of the tower, and allowed to flow upward through the tower while contacting the mixture of metals or metal preparations in its course. In some cases it may be desirable to install at the outlet of this tower a settling chamber or a filter unit, so that any entrained catalyst and/or reaction product can be separated from the purified effluent. Many physical modifications of these means of contacting the catalytic materials with the fluid to be treated, involving moving the catalysts, the material being treated, or both, are evident, and are within the scope of this invention.

The exact mechanism by which traces of the various impurities in mixtures containing at least minor proportions of aliphatic mono-olefins are so completely removed is not known. The capacity of an active nickel hydrogenation catalyst to react with some types of sulfur compounds, and at higher temperatures with some reactive hydrocarbons, oxygen containing compounds, and the like, has been recognized. However, our combination of metals has been found to afford much more complete purification than can be secured with active nickel or similar metals alone.

The power of sodium, and alkali and alkaline earth metals in general, to react with water, most alcohols, some sulfur compounds, and so forth, is well known. The rather specific power of sodium to react with diolefins may in some application favor the use of sodium alone or in a mixture with other alkali and alkaline earth metals. The purification secured through the use of the two metal species in conjunction is much more satisfactory than that secured with sodium alone, or with independent treatments with sodium and a nickel catalyst preparation, for example.

It is postulated that the formation of a very reactive complex by combination of an olefin with the alkali or alkaline earth metal in the purification system, perhaps catalyzed by the metal in the active hydrogenation catalyst may occur, and that the reactive complex may then combine with or convert the various materials which act as poisons to insoluble or unreactive residues, or to materials which are strongly adsorbed by the active nickel. In support of this viewpoint, it has been found that the mixtures of metals which have been highly active in purification systems inflame instantly on exposure to the oxygen of the atmosphere. These theoretical considerations are here expressed to make more clear some of the aspects of the present invention; they are not to be construed as in any way unduly limiting or defining the scope of this invention.

Low molecular weight olefins such as ethylene and propylene are readily obtainable in relatively high purity by the practice of our invention. For example, the commercial cylinder preparations of these gases are about 99.5 per cent pure. We have found, however, the impurities present in these gases greatly inhibit the activity of certain contact catalysts, and that ordinary purification methods are inadequate to satisfactorily remove these impurities.

The exact nature of the particular undesirable impurities is not known. It is known, however, that the commercial preparations of low molecular weight olefins may contain as impurities small amounts of sulfur compounds, saturated hydrocarbons, acetylenes, diolefins, water, and traces of the atmospheric gases.

Any of the various known methods of removing small amounts of such impurities from a charge stock will produce some improvement in quality, but such resultant purified charge stock is not sufficiently pure for use in certain catalytic reactions, and in such cases an extreme purification of the charge stock, such as we have discovered, is necessary.

The necessity of purification of olefinic charge stocks, and the superior results obtained by our herein disclosed method of purification, are shown by the following series of runs.

Example I

An olefinic gasoline prepared by polymerization was found to affect the activity of a nickel hydrogenation catalyst so that not more than 300 volumes of gasoline per volume of catalyst could be hydrogenated satisfactorily. The sulfur content of the charge to be hydrogenated had been reduced by chemical treatment to 0.002 per cent, and the proportion of diolefin and other reactive materials was believed to be low. A very low concentration of oxygen compounds was present. However, by contacting the gasoline in liquid phase with pelleted active nickel on kieselguhr commingled with sodium in a tower at 125° C., the hydrogenation catalyst was found to retain its activity during the hydrogenation of more than 2000 volumes of olefin-containing gasoline.

Example II

In a series of runs ethylene gas, as obtained in a commercial cylinder, was converted to olefinic polymer containing polymeric species ranging from butenes to olefinic waxes by treatment at 110° C. and 600 pounds per square inch gage pressure in the presence of a catalyst comprising active nickel-nickel oxide on gieselguhr. Purified normal pentane was used as a diluent in order to facilitate contact and control of temperature in the catalyst mass.

In such a system, using ethylene directly from a cylinder, less than one part of ethylene per 100 parts of catalyst was converted to polymer during a two hour period.

Example III

Ethylene gas similar to that used in Example II was purified by passing it through a bed of reduced nickel on kieselguhr hydrogenation catalyst held at 176° C. Such a purified ethylene gas was then subjected to conditions similar to those described for the treatment of commercial ethylene gas in Example II. Using such a purified charge stock, approximately 20 parts of ethylene per 100 parts catalyst was converted to polymer during two hours operation.

Thus, considerable improvement in catalyst activity was obtained by this purification step.

Example IV

The run cited in Example III was repeated except that the ethylene after being purified by passing it through a bed of reduced nickel on kieselguhr hydrogenation catalyst, was further purified by passing it through a bed of sodium hydroxide on asbestos. The subsequent polymerization of the thus purified commercial ethylene was carried out under the conditions already stated. Approximately 40 parts of ethylene was polymerized by 100 parts of catalyst during two hours operation.

A further increase in catalyst activity is therefore obtained by the added purification obtained by the treatment with sodium hydroxide adsorbent.

Example V

The run cited in Example IV was repeated except that after the purification step using reduced nickel on kieselguhr hydrogenation catalyst, the ethylene effluent was contacted with molten metallic sodium at a temperature of 110° C., and then passed through a bed of sodium hydroxide on asbestos. The subsequent polymerization of the thus purified commercial ethylene was carried out in the manner previously described. Approximately 50 parts of ethylene was converted to polymer by 100 parts of catalyst during a two hour period.

This run showed that a slight improvement in catalyst activity was obtained by the sodium treatment.

Example VI

In another run commercial ethylene was purified by contacting it with a mixture of reduced nickel on kieselguhr hydrogenation catalyst and molten metallic sodium, at a temperature of 110° C. The purification mixture was agitated during the treating period. After this treatment, the resultant ethylene was passed through a bed of sodium hydroxide supported on asbestos, and then polymerized under the same conditions as previously described. In this polymerization run approximately 130 parts of ethylene was polymerized by 100 parts of catalyst during two hours operation.

This run showed that reduced nickel on kieselguhr hydrogenation catalyst in combination with metallic molten sodium, produced a degree of purification far greater than that obtained by using the two separately.

No other combination of purifications steps was as effective in maintaining catalyst activity as that used in this run.

Example VII

In a series of runs similar to those cited in Examples II to VI, except that commercial cylinder propylene was used in place of ethylene, it was found that similar extreme purification was necessary to obtain optimum catalyst activity. The combination of sodium metal and reduced nickel on kieselguhr hydrogenation catalyst was here also the most effective means of purification. In this series of runs the propylene was converted two to three times as rapidly as the ethylene under similar conditions.

These examples have illustrated several typical applications of our process for the purification of charge stocks to contact catalyst processes and the advantages of our methods of operating over existing methods. The examples, however, are not necessarily to be taken as establishing limitations of the process.

We claim:

1. A process for removing impurities from normally gaseous olefin hydrocarbon mixtures containing said impurities which comprises, contacting such a mixture at a temperature between 50 and 150° C. in the absence of any substantial amount of free hydrogen with a mixture of a metal selected from the group consisting of the alkali metals and the alkaline earth metals together with a metal selected from the group consisting of nickel, iron, and cobalt.

2. In a catalytic conversion process wherein an aliphatic hydrocarbon charge stock thereto contains olefin hydrocarbons and impurities deleterious to a catalyst used in a catalytic conversion step thereof, the improvement which comprises contacting said charge stock at a temperature between 50 and 150° C. in the absence of any substantial amount of free hydrogen with a mixture comprising an alkali metal and a metal selected from the iron group and active in itself as a hydrogenation catalyst to remove said impurities.

3. The improvement of claim 2 in which the metal selected from the iron group is nickel.

4. The improvement of claim 2 in which the metal selected from the iron group is adsorbed on kieselguhr.

5. A process for purifying a low-boiling aliphatic hydrocarbon mixture which contains small amounts of undesired reactive impurities, which comprises contacting such a hydrocarbon mixture at a temperature between 50 and 150° C. in the absence of any substantial amount of free hydrogen with a mixture comprising an alkali metal in a molten condition intimately associated with metallic nickel which, in the form present, is catalytically active as an olefin hydrogenation catalyst.

6. A process for purifying an aliphatic hydrocarbon mixture which contains olefins and undesired reactive impurities, which comprises contacting such a hydrocarbon mixture, in the absence of any substantial amount of free hydrogen, at a temperature between 50 and 150° C. with a mixture comprising a molten alkali metal intimately associated with a metal of the iron group which, in the form present, is catalytically active as an olefin hydrogenation catalyst.

7. In a catalytic conversion process wherein olefins in an olefin containing hydrocarbon mixture are reacted in the presence of a solid contact catalyst which is susceptible to poisoning by reactive impurities of said hydrocarbon mixture other than said olefins, the improvement which comprises removing such impurities prior to contact with such a solid catalyst by contacting such a hydrocarbon mixture at a temperature between 50 and 150° C. in the absence of any substantial amount of free hydrogen with a mixture comprising a molten alkali metal intimately associated with a metal of the iron group which, in the form present, is catalytically active as an olefin hydrogenation catalyst.

8. A process for purifying a low-boiling aliphatic hydrocarbon mixture which contains small amounts of undesired reactive impurities, which comprises contacting such a hydrocarbon mixture at a temperature between 50 and 150° C. in the absence of any substantial amount of free hydrogen with a mixture comprising an alkali metal in a molten condition intimately associated with a metal of the iron group which, in the form present, is catalytically active as an olefin hydrogenation catalyst.

9. The process of claim 5 in which said alkali metal comprises sodium.

GRANT C. BAILEY.
JAMES A. REID.